United States Patent [19]

Homan et al.

[11] 4,265,792
[45] May 5, 1981

[54] COMPOSITIONS INCLUDING MERCAPTOORGANOPOLYSILOXANES AND STANNIC SALTS OF CARBOXYLIC ACIDS

[75] Inventors: Gary R. Homan; Chi-Long Lee, both of Midland, Mich.

[73] Assignee: Dow Corning Corporation, Midland, Mich.

[21] Appl. No.: 99,299

[22] Filed: Dec. 3, 1979

[51] Int. Cl.³ .............................................. C08L 91/00
[52] U.S. Cl. ................................ 260/18 S; 260/37 SB; 260/45.7 S; 260/45.75 S; 528/18; 528/26; 528/30; 528/43; 528/901
[58] Field of Search ............. 260/18 S, 37 SB, 45.7 S, 260/45.75 S; 528/18, 26, 30, 43, 901

[56] References Cited

U.S. PATENT DOCUMENTS

| | | | |
|---|---|---|---|
| 3,445,419 | 5/1969 | Vanderlinde | 260/37 |
| 3,655,713 | 4/1972 | Le Grow | 260/448.2 N |
| 3,816,282 | 6/1974 | Viventi | 204/159.13 |
| 3,873,499 | 3/1975 | Michael et al. | 204/159.13 |
| 4,039,504 | 8/1977 | Homan et al. | 260/37 SB |
| 4,039,505 | 8/1977 | Homan et al. | 260/37 SB |
| 4,064,027 | 12/1977 | Gant | 204/159.13 |
| 4,066,603 | 1/1978 | Homan et al. | 260/37 SB |
| 4,070,328 | 1/1978 | Homan et al. | 260/37 SB |
| 4,070,329 | 1/1978 | Homan et al. | 260/37 SB |

FOREIGN PATENT DOCUMENTS 2008426 9/1970 Fed. Rep. of Germany .

Primary Examiner—Melvyn I. Marquis
Attorney, Agent, or Firm—Roger H. Borrousch

[57] ABSTRACT

Mixing mercaptoorganopolysiloxanes with a stannic salt of a carboxylic acid, and optionally a filler, provides useful new compositions including gums, organotin-containing polymers and materials curable to elastomers at room temperature.

7 Claims, No Drawings

COMPOSITIONS INCLUDING MERCAPTOORGANOPOLYSILOXANES AND STANNIC SALTS OF CARBOXYLIC ACIDS

BACKGROUND OF THE INVENTION

1. Field of the Invention

This invention relates to compositions including siloxane polymers and siloxane elastomers containing sulfur.

2. Description of the Prior Art

Applicants' U.S. Pat. Nos. 4,039,504 and 4,039,505 are generally directed to compositions curable to elastomers at room temperature or with heat. These compositions are prepared from mixtures of certain polymethylvinylsiloxanes and mercaptoorganopolysiloxanes with an organic peroxide, and optionally a filler.

Applicants' U.S. Pat. No. 4,070,329 discloses compositions prepared from mixtures of mercaptoorganopolysiloxanes and organic peroxide catalysts. Applicants' U.S. Pat. No. 4,070,328 discloses compositions prepared from mixtures of mercaptoorganopolysiloxanes, organic hydroperoxide, and selected nitrogen compounds. The compositions prepared according to these references can be used as sealants which rapidly cure to elastomers with non-tacky surfaces.

Numerous other prior art references are directed to compositions involving mercaptoorganopolysiloxanes and mixtures thereof with alkenyl-containing siloxanes as well as to curing systems employing electromagnetic and particulate radiation. These references include: U.S. Pat. No. 3,445,419; U.S. Pat. No. 3,816,282; U.S. Pat. No. 3,873,499; German Patent Publication (OLS) No. 2,008,426; U.S. Pat. No. 4,064,027; U.S. Pat. No. 4,066,603; and, U.S. Patent Application Ser. No. 663,326, filed Mar. 3, 1976, by Gary N. Bokerman and Robert E. Kalinowski, entitled "Method of Curing Thick Section Elastomers" and assigned to the same assignee as the present invention now abandoned. The disclosures of the above-identified patents and applications are specifically incorporated by reference herein for the purpose of exemplifying the state of the prior art.

Although the prior art describes elastomeric materials formed by mixing mercaptoorganopolysiloxanes with alkenyl-containing polysiloxanes and organic peroxides, by mixing mercaptoorganopolysiloxanes with organic peroxides alone, or by mixing mercaptoorganopolysiloxanes with organic hydroperoxides and selected nitrogen compounds, it was not expected that useful materials, including elastomeric materials, could be provided by mixing, at room temperature, mercaptoorganopolysiloxanes and stannic salts of carboxylic acids in the absence of a peroxide catalyst or other free radical generating catalytic means.

SUMMARY OF THE INVENTION

According to the present invention, novel compositions of matter are provided by mixing mercaptoorganopolysiloxanes with stannic salts of carboxylic acids. Included among the compositions provided according to the invention are compositions curable to elastomers at room temperature either in the presence or absence of an oxygen-containing atmosphere such as air. Curable compositions of the invention may optionally include fillers and provide sealants which cure rapidly to elastomeric materials with non-tacky surfaces. Also included among the compositions provided according to the invention are organotin-containing polymers and gums containing —C—S—Sn($R^3$)$_2$—S—C— linkages. The organotin-containing polymers are expected to be useful as additives to elastomers or as components in special purpose materials such as anti-foulant marine coatings.

DESCRIPTION OF THE INVENTION

This invention relates to compositions of matter comprising materials prepared by mixing (A) a mercaptoorganopolysiloxane consisting essentially of a combination of units selected from dimethylsiloxane units, trimethylsiloxane units, hydroxydimethylsiloxane units, units of the formula

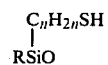

units of the formula

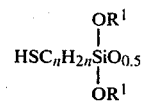

units of the formula

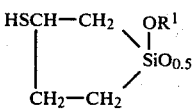

units of the formula

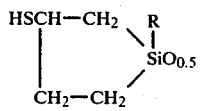

units of the formula

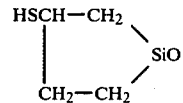

and units of the formula

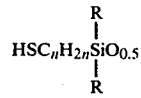

wherein: R is a monovalent radical selected from the group consisting of alkyl radicals of from 1 to 3 carbon atoms inclusive and phenyl radicals; $R^1$ is methyl or ethyl; and, n has a value of from 1 to 4 inclusive, there being in said mercaptoorganopolysiloxane an average of at least two mercapto-containing siloxane units per molecule and no more than 10 mole percent mercapto-containing siloxane units based on the total number of siloxane units in the mercaptoorganopolysiloxane;

(B) a stannic salt of a carboxylic acid selected from the group consisting of those represented by the formula

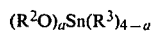

wherein: $R^2$ is a monovalent acyl radical; $R^3$ is a monovalent hydrocarbon radical; and a has a value of from 1 to 4 inclusive, and those represented by the formula

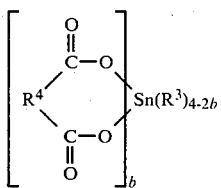

wherein: $R^3$ is defined above; $R^4$ is a divalent hydrocarbon radical; and b is 1 or 2, said stannic salt being present in an amount sufficient to provide at least $1/a$ stannic salt molecules per mercaptoorganopolysiloxane molecule or at least $\frac{1}{2}b$ stannic salt molecules per mercaptoorganopolysiloxane molecule; and (C) a filler in an amount of from 0 to 200 parts by weight per 100 parts by weight of (A).

Incorporated by reference herein are applicants' U.S. Patent Applications Ser. Nos. 099,301 pending and 099,298 pending, filed concurrently herewith and respectively entitled "Compositions Including Mercaptoorganopolysiloxanes and Stannous Salts of Carboxylic Acids" and "Mercaptoorganopolysiloxane Elastomers Catalyzed by Metallic Compounds in the Presence of Peroxides".

The mercaptoorganopolysiloxanes useful in practice of the present invention include those consisting essentially of dimethylsiloxane units, trimethylsiloxane units, hydroxydimethylsiloxane units, and units represented by the formulas

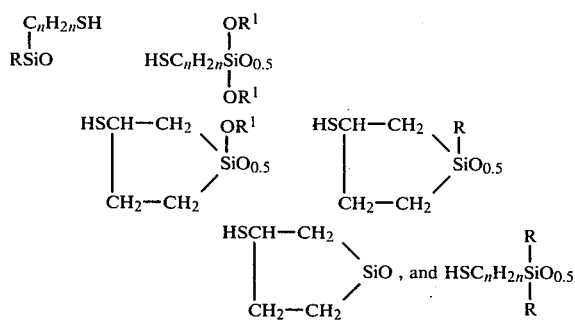

wherein: R is a monovalent radical selected from the group consisting of alkyl radicals of from 1 to 3 carbon atoms inclusive (such as methyl, ethyl and propyl) and phenyl radicals; $R^1$ is methyl or ethyl; and n has a value of from 1 to 4 inclusive and preferably has a value of 3, there being present in such mercaptoorganopolysiloxanes an average of at least two mercapto-containing siloxane units per molecule and no more than 10 mole percent mercapto-containing siloxane units based on the total units in the mercaptoorganopolysiloxane.

Preferred mercaptoorganopolysiloxanes include those having "terminal" mercapto groups such as those represented by the formulas I through IV:

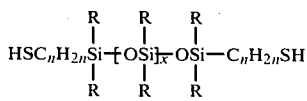    I

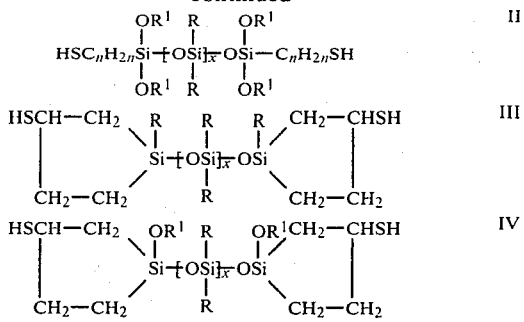

wherein R, $R^1$ and n are as defined above and x has a value of from 18 to 1000 and preferably 200 to 800, and those having "pendant" mercapto groups such as those represented by formulas V through VIII:

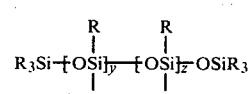    V

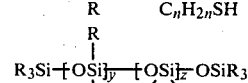

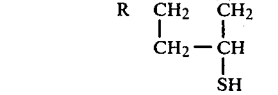    VI

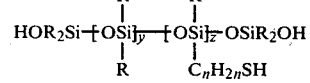    VII

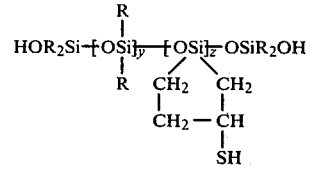    VIII wherein n and R are as above; $y+z$ has a value of from 18 to 1000 and preferably 200 to 800, and z is at least 2 and no more than a number providing 10 mole percent mercapto-containing siloxane units, based on total siloxane units in the polymer.

The mercaptoorganopolysiloxanes of formulas I and V are known in the art as evidenced by the prior art cited herein. The mercaptosilacyclopentylopolysiloxanes of formulas III and VI and their position isomers can be prepared by the method defined in U.S. Pat. No. 3,655,713, which is hereby incorporated by reference to show the mercaptosilacyclopentylpolysiloxanes and their preparation. The mercaptoorganopolysiloxanes of formula II which contain endblocking units of the formula

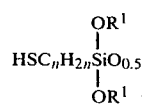

can be prepared by reacting a hydroxyl endblocked polydimethylsiloxane and a mercaptoalkyltrialkoxysilane of the formula

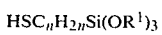

in the presence of solid potassium hydroxide or potassium silanolate catalysts. The potassium silanolate catalyst is preferred for the higher viscosity polydimethylsiloxanes. The mercaptoalkyltrialkoxysilane is preferably used in excess of about 10 mole percent over stoichiometric amounts. The resulting product is essentially a polydimethylsiloxane endblocked with the units of the formula

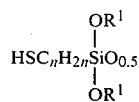

but there may be some small amounts of units wherein two SiOH groups have reacted with one mercaptoalkyltrialkoxysilane molecule, but these amounts are small enough that the character of the endblocked polydimethylsiloxane is not noticeably altered.

Stannic salts of carboxylic acids useful in practice of the invention can be represented by the formula:

wherein $R^2$ is a monovalent acyl radical; $R^3$ is a monovalent hydrocarbon radical; and a has a value of from 1 to 4 inclusive.

Also useful in practice of the invention are stannic salts of dicarboxylic acids represented by the formula:

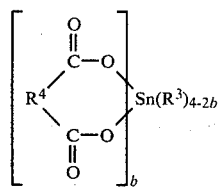

wherein $R^3$ is as above; $R^4$ is a divalent hydrocarbon radical such as ortho-phenylene; and b is 1 or 2.

The monovalent hydrocarbon radicals, $R^3$, providing suitable stannic salt substituents include methyl, ethyl, propyl, butyl, n-octyl, cyclohexyl and phenyl. Monovalent acyl radicals, $R^2$, providing suitable stannic salt substituents include acetyl, propionyl, isobutyryl, stearoyl, lauroyl, 2-ethylhexoyl (sometimes referred to as "octanoyl"), oleoyl, linoleoyl, benzoyl, naphthoyl, $\beta$-benzoyl-propionyl, crotonyl, atropoyl, palmitoyl, and cinnamoyl.

Preferred stannic salts of the representative formula $(R^2O)_4Sn$ include stannic tetraacetate; of the formula $(R^2O)_3SnR^3$ include n-butyltin triacetate; of the formula $(R^2O)_2Sn(R^3)_2$ include di-n-butyltin dilaurate and di-n-butyltin diacetate; and of the formula $R^2OSn(R^3)_3$ include tri-n-butyltin acetate.

While not intended to be binding upon practice of the present invention, it is believed that the reaction of the stannic salts with the mercaptoorganosiloxanes involves the formation of an —Sn—S—C— covalent bond. In determining the quantities of stannic salt for admixing with a mercaptoorganopolysiloxane to effect such a reaction one should consider the number of mercapto groups of the polymer and the number of —Sn—O— bonds of the selected stannic salt to provide the desired degree of —Sn—S—C— bond formation.

In the following discussion, the stoichiometric amounts are those amounts of reactants necessary to provide one mercapto group per —Sn—O— bond of the stannic salt.

The compositions of this invention can be obtained by mixing mercaptoorganopolysiloxane, (A), with stannic salt, (B), in which the stannic salt is present in an amount sufficient to provide at least 1/a stannic salt molecules per mercaptoorganopolysiloxane molecule or at least ½b stannic salt molecules per mercaptoorganopolysiloxane molecule. The compositions at the lowest amounts of stannic salt are mercapto functional organopolysiloxanes which also contain —Sn—S—C— linkages. Increasing the amount of stannic salt provides a variety of useful compositions depending upon the number of mercapto groups per molecule in (A) and the value of a and b in (B). When a is 1, the resulting products will be polymers which contain —C—S—Sn($R^3$)$_3$ groups in increasing amounts as the amount of stannic salt is increased until there is at least one stannic salt —Sn—O— bond for each mercapto group in (A), thus providing polymers having one —C—S—Sn($R^3$)$_3$ group for each mercapto group in the starting mercaptoorganopolysiloxane. When a is 2, the resulting products will be polymers which contain —C—S—Sn($R^3$)$_2$—S—C— linkages and will increase in molecular weight until high molecular weight gums are formed as the ratio of —Sn—O— bonds in (B) to mercapto groups in (A) becomes about 1:1 wherein (A) has two mercapto groups per molecule. When a is 2 and (A) has more than two mercapto groups per molecule, the resulting products will be polymers which contain —C—S—Sn($R^3$)$_2$—S—C— linkages at very low levels of stannic salt and as the amount of stannic salt increases, the resulting products will form gels and finally elastomeric products. When a is 3 or 4, the resulting products will be elastomeric materials which contain $+$C—S$+$$_3$Sn$R^3$ linkages and $+$C—S$+$$_4$Sn linkages respectively, except when very low levels of stannic salt are employed, in which case polymers containing the stated linkages will be formed.

In keeping with the above, mercaptoorganopolysiloxanes of the general formulas I through IV: when admixed with stoichiometric amounts of stannic salt represented by the formulas $R^2OSn(R^3)_3$ yield polymers terminated with —C—S—Sn($R^3$)$_3$ containing siloxane units which are expected to be useful as additives to conventional elastomeric compositions; when mixed with less than stoichiometric quantities of stannic salt represented by the formula $R^2OSn(R^3)_3$ yield polymers having both terminal —C—S—Sn($R^3$)$_3$ containing siloxane units and mercapto groups which are expected to be useful in preparation of elastomers cured by other mercapto curing systems; when mixed with stoichiometric quantities of stannic salts represented by the formula $(R^2O)_2Sn(R^3)_2$ or

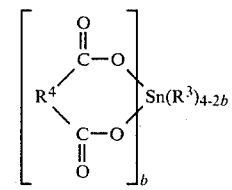

yield linear gums including —C—S—Sn($R^3$)$_2$—S—C— linkages; and, when mixed with quantities of stannic salt represented by one of the formulas $(R^2O)_3SnR^3$ or $(R^2O)_4Sn$ yield elastomeric materials, where the ratio of mercapto groups to —Sn—O— bonds is approximately 1:1.

Similarly, mercaptoorganopolysiloxanes of the general formulas V through VIII: when mixed with less than stoichiometric quantities of stannic salt represented by the formula $R^2OSn(R^3)_3$ yield polymers having both —C—S—Sn($R^3$)$_3$ pendant groups and mercapto groups which are expected to be useful in the preparation of elastomers cured by other mercapto curing systems; when mixed with stoichiometric quantities of stannic salt represented by the formula $R^2OSn(R^3)_3$ yield polymers having pendant —C—S—Sn($R^3$)$_3$ groups which are expected to be useful as additives to conventional elastomeric compositions; and when mixed with quantities of stannic salt represented by one of the formulas,

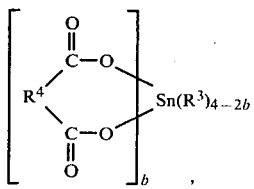

$(R^2O)_2Sn(R^3)_2$, $(R^2O)_3SnR^3$ and $(R^2O)_4Sn$ yield elastomeric materials, where the ratio of mercapto groups to —Sn—O— bonds is approximately 1:1.

Mixtures of one or more polymers selected from among those formulas I through IV and one or more polymers selected from among those of formulas V and VI, when mixed with quantities of stannic salt represented by one of the formulas,

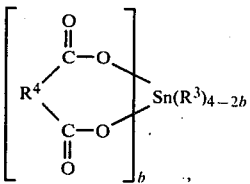

$(R^2O)_2Sn(R^3)_2$, $(R^2O)_3SnR^3$ and $(R^2O)_4Sn$ yield elastomeric materials, where the ratio of mercapto groups to —Sn—O— groups is approximately 1:1.

In those mixtures described above which provide elastomeric materials, the ratio of mercapto groups per —Sn—O— bonds of approximately 1:1 is considered to give optimum results. However, varying the ratio within from approximately 0.5:1 to 2:1 will still provide useful elastomeric materials.

Fillers can be used in the compositions of this invention, but are not required. The fillers can be both treated and untreated reinforcing fillers, such as fume silica and fume silica having triorganosiloxy groups, such as trimethylsiloxy groups on the surface, carbon black or precipitated silica, and extending fillers such as crushed or ground quartz, diatomaceous earth, and calcium carbonate. The curable elastomeric compositions contain filler up to about 200 parts by weight per 100 parts by weight mercaptoorganopolysiloxanes.

The compositions of this invention which cure to elastomers do so rapidly at room temperature, either in the presence or absence of an oxygen-containing atmosphere such as air. High speed mixing and dispensing equipment is suggested to thoroughly mix the ingredients and place them in position for cure before substantial curing takes place. The resulting elastomer has a dry or non-tacky surface. Air inhibition such as is observed with conventional non-mercapto-containing peroxide cured silicone rubber composition is not observed and the inhibition by various materials such as sulfur and phosphorus as observed in platinum catalyzed compositions containing aliphatic unsaturated siloxanes and SiH-containing siloxanes, is not observed. Rapidly curing elastomers of the invention are expected to be useful in making dental impressions and can be provided by mixing of mercaptoorganopolysiloxanes (optionally including a filler) and stannic salt. Such compositions could be packaged separately as a two-package sealant system.

Polymers of the invention having —C—S—Sn($R^3$)$_3$ substituents, such as —C—S—Sn(CH$_2$CH$_2$CH$_2$CH$_3$)$_3$, are expected to be useful in the preparation of marine coatings wherein such substituents, by structural analogy to known antifoulant additive materials, are expected to display antifoulant characteristics.

The following examples are presented for illustration purposes and should not be construed as limiting the invention.

EXAMPLE 1

An elastomer was prepared by mixing 100 parts by weight of a polymer of the average formula

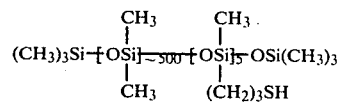

with 2 parts by weight dibutyltindiacetate (DBTDA). The polymer had 0.49 weight percent —SH (0.0148 moles —SH/100 g polymer) as determined by iodine titration. The mixture gelled and cured to an elastomeric product at room temperature is less than one minute and the elastomeric product had a non-tacky surface in less than one hour.

EXAMPLE 2

Elastomers were prepared by mixing 100 parts by weight of the polymer as described in Example 1 with 1, 0.5 and 0.1 parts by weight DBTDA. The mixture containing one part by weight DBTDA cured almost as rapidly as the mixture of Example 1, while the other mixtures gelled immediately but did not cure at room temperature even after several days.

EXAMPLE 3

Elastomers were prepared by mixing 100 parts by weight of the polymer as described in Example 1 with 2, 1, 0.5 and 0.1 parts by weight of dibutyltindilaurate (DBTDL). As was the case in Examples 1 and 2, the mixtures with one and two parts by weight of DBTDL cured rapidly to give a tack-free elastomer at room temperature while the other two mixtures did not cure after several days at room temperature.

EXAMPLE 4

The following reactions using a model compound of the formula

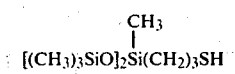

were studied at 25° C.

Study 1

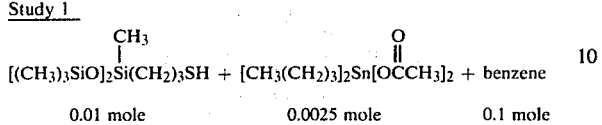

Study 2

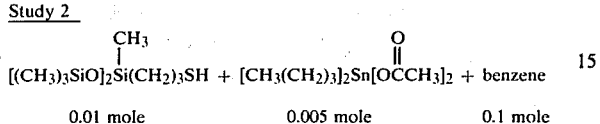

The purpose of these two studies was to determine whether the mercapto reacts with the DBTDA stoichiometrically. The nuclear magnetic resonance spectrum, NMR, analysis of Study 1 after 24 hours of reaction at room temperature, revealed the formation of a triplet with $\delta$ values; 2.51, 2.63, and 2.74 ppm, respectively. Because this triplet was downfield of a disulfide chemical shift, it suggested that a deshielding atom may be attached to the sulfur atom.

Gas liquid chromatographic analysis, glc, of the reaction mixture showed multiple product peaks and a question arises as to whether those peaks represent a number of products or decomposition products of a single tin compound. It is known that tin compounds may decompose readily in a glc column to give similar multiple peaks. To clarify this point, the reaction product was analyzed by glc-mass spectroscopy. The product was identified as $\{[(CH_3)_3SiO]_2Si(CH_3)-(CH_2)_3S\}_2Sn(CH_2CH_2CH_2CH_3)_2$. It can be concluded, therefore, that the reaction proceeds as follows:

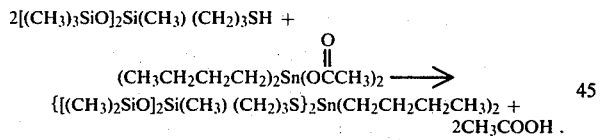

In Study 2, the mole ratio of DBTDA to $[(CH_3)_3SiO]_2-Si(CH_3)(CH_2)_3SH$ was increased to 1:2. The NMR spectrum of the reaction mixture after 24 hours at room temperature revealed the triplet with $\delta$ values of 2.68, 2.80 and 2.92 ppm, consistent with those found in Study 1, confirming the formation of a $-CH_2SSnSCH_2-$ linkage. Both Study 1 and Study 2 gave only diadduct because no monoadduct, $[(CH_3)_3SiO]_2-Si(CH_3)(CH_2)_3SSn(CH_2CH_2CH_2CH_3)_2(OOCCH_3)$ was found by glc analysis.

Numerous modifications and variations in the practice of the invention are expected to occur to those skilled in the art upon consideration of the foregoing description and only such limitations as appear in the appended claims should be placed thereon.

What is claimed is:

1. A composition of matter comprising a material prepared by mixing (A) a mercaptoorganopolysiloxane consisting essentially of a combination of units selected from dimethylsiloxane units, trimethylsiloxane units, hydroxydimethylsiloxane units, units of the formula

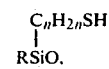

units of the formula

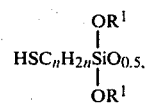

units of the formula

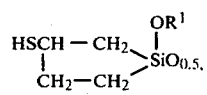

units of the formula

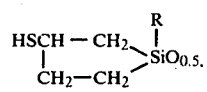

units of the formula

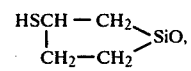

and units of the formula

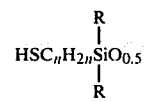

wherein: R is a monovalent radical selected from the group consisting of alkyl radicals of from 1 to 3 carbon atoms inclusive and phenyl radicals; $R^1$ is methyl or ethyl; and, n has a value of from 1 to 4 inclusive, there being in said mercaptoorganopolysiloxane an average of at least two mercapto-containing siloxane units per molecule and no more than 10 mole percent mercapto-containing siloxane units based on the total number of siloxane units in the mercaptoorganopolysiloxane;

(B) a stannic salt of a carboxylic acid selected from the group consisting of those represented by the formula

wherein: $R^2$ is a monovalent acyl radical; $R^3$ is a monovalent hydrocarbon radical; and a has a value of from 1 to 4 inclusive, and those represented by the formula

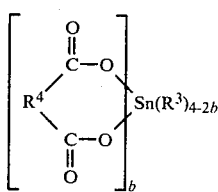

wherein: $R^3$ is defined above; $R^4$ is a divalent hydrocarbon radical; and b is 1 or 2, said stannic salt being present in an amount sufficient to provide at least $1/a$ stannic salt molecules per mercaptoorganopolysiloxane molecule or at least $1/2b$ stannic salt molecules per mercaptoorganopolysiloxane molecule; and (C) a filler in an amount of from 0 to 200 parts by weight per 100 parts by weight of (A).

2. The composition according to claim 1 and curable to an elastomer in which (A) comprises one or more mercaptoorganopolysiloxanes selected from the group consisting of those represented by the formulas:

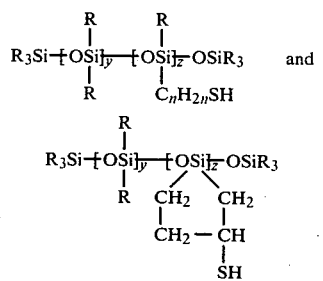

wherein $z > 2$ and $y + z$ has a value of from about 18 to 1000, and (B) is a stannic salt of a carboxylic acid of the formula

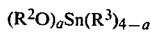
$(R^2O)_a Sn(R^3)_{4-a}$ in which a is at least 2 and said stannic salt is present in an amount sufficient to provide about a 1:1 ratio of —Sn—O— bonds in the stannic salt per mercapto group in the mercaptoorganopolysiloxanes.

3. The composition according to claim 2 additionally including one or more mercaptoorganopolysiloxanes selected from the group consisting of those represented by the formulas

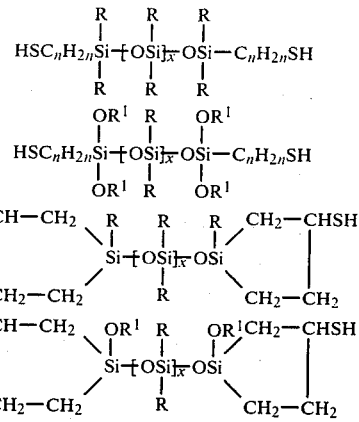

wherein x has a value of from 18 to 1000.

4. The composition according to claim 1 in which (B) is dibutyltindilaurate.

5. The composition according to claim 1 in which (B) is dibutyltindiacetate.

6. The composition according to claim 1 in which the value of n in (A) is 3.

7. The composition according to claim 1 in which (A) is one or more mercaptoorganopolysiloxanes selected from the group consisting of those represented by the formulas

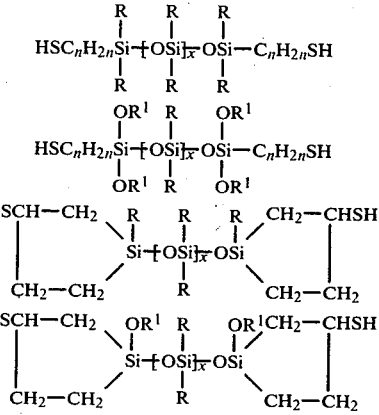

wherein x has a value of from 18 to 1000 and $R^1$ is methyl or ethyl, and (B) is a stannic salt or a carboxylic acid of the formula

$(R^2O)_a Sn(R^3)_{4-a}$ in which a is 3 or 4.

* * * * *

UNITED STATES PATENT AND TRADEMARK OFFICE
CERTIFICATE OF CORRECTION

PATENT NO. : 4,265,792
DATED : May 5, 1981
INVENTOR(S) : Gary R. Homan and Chi-long Lee It is certified that error appears in the above—identified patent and that said Letters Patent is hereby corrected as shown below:

Column 11, line 40 - the phrase "wherein $z>2$ and" should read "wherein $z\geq 2$ and"

Signed and Sealed this

Fourteenth Day of September 1982

[SEAL]

Attest:

Attesting Officer

GERALD J. MOSSINGHOFF

Commissioner of Patents and Trademarks